United States Patent
Yao et al.

(10) Patent No.: US 11,111,918 B2
(45) Date of Patent: Sep. 7, 2021

(54) ROTARY DEVICE, ROTARY SYSTEM, AND FLUID MACHINERY, TO WHICH PRESS-ACTUATED GATE VALVE MECHANISM IS APPLIED

(71) Applicant: BEIJING ROSTAR TECHNOLOGY CO. LTD., Beijing (CN)

(72) Inventors: Qihuai Yao, Beijing (CN); Frank Yao, Beijing (CN)

(73) Assignee: BEIJING ROSTAR TECHNOLOGY CO. LTD., Beijing (CN)

( * ) Notice: Subject to any disclaimer, the term of this patent is extended or adjusted under 35 U.S.C. 154(b) by 507 days.

(21) Appl. No.: 15/753,422

(22) PCT Filed: Aug. 19, 2016

(86) PCT No.: PCT/CN2016/095987
§ 371 (c)(1),
(2) Date: Jul. 17, 2018

(87) PCT Pub. No.: WO2017/032271
PCT Pub. Date: Mar. 2, 2017

(65) Prior Publication Data
US 2018/0320687 A1    Nov. 8, 2018

(30) Foreign Application Priority Data
Aug. 21, 2015  (CN) .......................... 201510518657.1

(51) Int. Cl.
| F03C 2/00 | (2006.01) |
| F03C 4/00 | (2006.01) |
| F04C 2/00 | (2006.01) |
| F04C 15/00 | (2006.01) |
| F04C 2/356 | (2006.01) |

(Continued)

(52) U.S. Cl.
CPC .............. *F04C 2/356* (2013.01); *F01C 1/356* (2013.01); *F01C 21/0854* (2013.01);
(Continued)

(58) Field of Classification Search
CPC ...... F01C 1/344; F01C 1/3441; F01C 1/3442; F01C 1/356; F01C 19/02; F01C 19/04;
(Continued)

(56) References Cited

U.S. PATENT DOCUMENTS 3,107,846 A * 10/1963 Mihalakis ............. F04C 2/3564
418/139
5,131,826 A *  7/1992 Boussicault ............ F04C 2/356
418/63

(Continued)

FOREIGN PATENT DOCUMENTS

| CN | 101846071 A | 9/2010 |
| CN | 101864991 A | 10/2010 |

(Continued)

OTHER PUBLICATIONS

CN102852788 A—Chen et al.—Vane Pump—Jan. 2, 2013—Machine English Translation (Year: 2013).*

(Continued)

*Primary Examiner* — Theresa Trieu
(74) *Attorney, Agent, or Firm* — Merchant & Gould P.C.

(57) ABSTRACT

The present disclosure provides a rotary device and a rotary system, to which a press-actuated gate valve mechanism is applied. In the rotary device and the rotary system, a pressure fluid chamber is disposed on an outside of a gate valve groove so that an action of a gate valve is controlled by means of a fluid pressure. Based on the rotary device and the rotary system, the present disclosure also provides a fluid motor, a compressor, a pump and a compressor corresponding to the rotary device and the rotary system.

10 Claims, 7 Drawing Sheets

(51) Int. Cl.
  *F01C 1/356* (2006.01)
  *F01C 21/08* (2006.01)
  *F16K 31/16* (2006.01)

(52) U.S. Cl.
  CPC .... *F04C 15/0007* (2013.01); *F04C 2230/602* (2013.01); *F16K 31/16* (2013.01)

(58) Field of Classification Search
  CPC .. F01C 21/0845; F01C 21/0854; F04C 2/344; F04C 2/3446; F04C 2/356; F04C 15/0007; F04C 2230/60; F04C 2230/602
  See application file for complete search history.

(56) References Cited

U.S. PATENT DOCUMENTS 5,222,884 A * 6/1993 Kapadia ................. F04C 2/356
  418/63

2015/0322790 A1* 11/2015 Yao .......................... F01C 1/356
  418/246

FOREIGN PATENT DOCUMENTS

| | | | |
|---|---|---|---|
| CN | 102852788 A | 1/2013 | |
| CN | 103061822 A | 4/2013 | |
| CN | 104100299 A | 10/2014 | |
| CN | 106151025 A | 11/2016 | |
| GB | 2 254 888 A | 10/1992 | |
| JP | 52055008 A * | 5/1977 | ............. F01C 1/356 |
| WO | 94/08139 A1 | 4/1994 | |

OTHER PUBLICATIONS

International Search Report and Written Opinion of the International Searching Authority for corresponding International Patent Application No. PCT/CN2016/095987 dated Nov. 8, 2016, 9 pages.

* cited by examiner

ROTARY DEVICE, ROTARY SYSTEM, AND FLUID MACHINERY, TO WHICH PRESS-ACTUATED GATE VALVE MECHANISM IS APPLIED

CROSS-REFERENCE TO RELATED APPLICATION

This application is a National Stage Application of No. PCT/CN2016/095987, filed 19 Aug. 2016, which claims benefit of Serial No. 2015105186571.1, filed 21 Aug. 2015 in China and which applications are incorporated herein by reference. A claim of priority is made to each of the above disclosed applications.

BACKGROUND

1. Technical Field

The present disclosure relates to the field of fluid machinery, and particularly to a rotary device, a rotary system, and fluid machinery, to which a press-actuated gate valve mechanism is applied.

2. Description of the Related Art

Fluid machinery is an energy converting device for converting a fluid pressure energy and a mechanical energy into each other, typically, such as, a fluid motor, a compressor, a pump, an engine, and the like.

The applicant of the present invention has devoted himself to research in the field of fluid machinery for many years and has proposed many innovation and improvement measures for prior art fluid machinery.

The applicant of the present invention filed a patent application of which the Chinese Patent Number CN10410029 and which is entitled "ECCENTRIC ROTOR TYPE ROTATION DEVICE" on Oct. 15, 2014. As shown in FIG. 1, an eccentric rotor type rotation device comprises: a cylindrical inner chamber having a central axis coinciding with a central axis of a main shaft 200; an eccentric crankshaft 310 which is fitted over a portion of the main shaft located in the cylindrical inner chamber and has a central axis being parallel to the central axis of the main shaft and offsetting from the central axis of the main shaft by a preset distance; a rolling piston wheel 330 which is fitted over the eccentric crankshaft 310 through a rolling bearing 320, is fixed to the planetary wheel fixation flanges, has a central axis coinciding with the central axis of the eccentric crankshaft, and rolls along an inner cylindrical surface of the cylinder block 110; and a partition mechanism having an end sealed against the rotor assembly to partition the axially-extending sealed working space into a first variable-volume chamber and a second variable-volume chamber. The first variable-volume chamber and the second variable-volume chamber are independent of each other and are in communication with an outside of the cylinder block through a first set of through hole(s) and a second set of through hole(s) disposed in the cylinder block, respectively.

In the abovementioned rotation device, the partition mechanism divides the piston space into the first variable-volume space and the second variable-volume space, and may be of many structures such as gate valves, rotary valve sheets, and rotary valve bodies.

The applicant of the present invention also filed a patent application of which the Chinese Patent Number CN106151025 and which is entitled "ROTARY SYSTEM AND FLUID MOTOR, COMPRESSOR, PUMP AND ENGINE TO WHICH ROTARY SYSTEM IS APPLIED" on Nov. 23, 2016. The rotary system comprises: a cylinder block inner chamber that is partitioned into three independent cylindrical inner chambers: a left chamber, a main chamber and a right chamber; a main shaft which has a central line coinciding with a central line of the cylinder block inner chamber, and passes through the left chamber, the main chamber and the right chamber in sequence; and a main rotary mechanism, a left rotary mechanism and a right rotary mechanism. The main rotary mechanism, the left rotary mechanism and the right rotary mechanism are respectively located inside the corresponding chambers, and each comprises an eccentric rotor assembly. Each eccentric rotor assembly is fitted over a portion of the main shaft located in the corresponding chamber, and forms an axially-extending sealed working space by rotating in the corresponding chamber. An eccentric force generated by the eccentric rotor assembly of the main rotary mechanism during movement is counterbalanced by the eccentric rotor assembly of the left rotary mechanism and the eccentric rotor assembly of the right rotary mechanism.

In the rotary system, the auxiliary rotary devices are disposed on both sides of the main rotary device, and the auxiliary rotary devices do work independently while serving the function of a balance arrangement, so as to avoid a vain energy consumption of a balance weight in the prior art, improving an energy converting efficiency.

The applicant of the present invention filed a patent application of which the Chinese Patent Number CN103061822 and which is entitled PLANETARY REVOLUTION TYPE ROTATION DEVICE WITH GATE VALVE STRUCTURE on Apr. 24, 2013. A gate valve groove is formed in a cylinder block composed of a cylinder block body and an inner cylinder liner, and a gate valve plate is disposed in the gate valve groove. The gate valve plate switches between a retracted state and a protruded state. When the gate valve plate is in the retracted state, a planetary piston wheel passes the gate valve plate. When the gate valve plate is in the protruded state, a distal end of the gate valve plate is in contact with an outer cylindrical surface of a center sun wheel drum on an inner side of an annular piston space, thereby partitioning the annular piston space into two variable volume piston spaces.

A gate valve driving structure comprises: two gate valve slide bars which are located on a radially outer side of the gate valve plate and each of which has a lower end fixed to the gate valve plate; and a gate valve fixation beam. The gate valve fixation beam is located on a radially outer side of the gate valve slide bars, and extends transversely towards both sides of the cylinder block along a central line of the cylinder block. A middle portion of the gate valve fixation beam is fixed to the other ends of the gate valve slide bars.

A gate valve controlling mechanism comprises two control parts. One of the control parts comprises a left outer cylindrical surface cam disk, a left gate valve control bar, and a left resetting spring. The left outer cylindrical surface cam disk is located on a left side of the center sun wheel drum and is fitted over a main shaft directly or through a planetary piston wheel fixation flange. N protrusions are uniformly distributed on an outside periphery of the left outer cylindrical surface cam disk. Positions of the protrusions of the left outer cylindrical surface cam disk correspond to the retracted state of the gate valve plate, while other positions of an outer cylindrical surface of the left outer cylindrical surface cam disk than the positions of the protrusions correspond to the protruded state of the gate valve plate. The left gate valve control bar is in the shape of a straight-line rod, is disposed in a radial direction of the left outer cylindrical surface cam disk, and has one end abutting against the outside periphery of the left outer cylindrical surface cam disk through a pressure wheel located under the one end, and the other end fixed to a left end of the gate valve fixation beam. The left resetting spring has one end fixed to the cylinder block, and the other end located at the left end of the gate valve fixation beam.

In the abovementioned planetary revolution type rotation device, the gate valve occupies a small space. Therefore, only the groove needs to be machined in the cylinder block, thereby causing less damage to a structural strength of the cylinder block as a whole. Furthermore, the gate valve plate has a planar structure with a geometry easy to be machined, so that there is little difficulty in machining the entire device and it is easy to control the accuracy of the entire device.

However, in the process of deepening production practice, the applicant gradually realized that the driving mechanism and the control mechanism of the gate valve are poor in reliability and maintainability, especially at a high rotational speed, since they have complicated mechanical structures. It becomes a technical problem to be solved urgently in the field of fluid machinery how to use a simple structure to achieve a control of the gate valve.

SUMMARY

In accordance with an aspect of the present disclosure, there is provided a rotary device with a press-actuated gate valve structure. The rotary device comprises: the cylinder block 10 which bounds a cylindrical inner chamber, which is formed with a gate valve groove on an inside of the cylinder block along a direction of a central axis of the cylindrical inner chamber, and which is formed with a pressure fluid chamber 11 on an outside of the gate valve groove; a rotor assembly 20 which forms an axially-extending sealed working space inside the cylindrical inner chamber by rotating in the cylindrical inner chamber; and a gate valve 30 mounted outside the rotor assembly 20, so that at least a region of an upper surface of the gate valve or at least a region of an upper surface of an extension of the gate valve is exposed in the pressure fluid chamber 11 and receives a force which is acted on the gate valve towards an inside of the cylinder block by a pressure fluid in the pressure fluid chamber 11; wherein the gate valve 30 has an end pressed against an outer surface of the rotor assembly, and successively switches between a retracted state and a protruded state, so that the gate valve is retracted in the gate valve groove when in the retracted state, and the gate valve is protruded from the gate valve groove to partition the axially-extending sealed working space into two variable volume piston spaces, i.e., a first piston space A and a second piston space B, when in the protruded state.

In accordance with another aspect of the present disclosure, there is also provided a rotary system with a press-actuated gate valve structure. The rotary system comprises: a cylinder block inner chamber partitioned into M cylindrical inner chambers, wherein a gate valve groove is formed at each of the M cylindrical inner chambers along a direction of a central axis of the cylinder block inner chamber, and a pressure fluid chamber is formed on an outside of each of the gate valve grooves; M rotor assemblies which are located in the corresponding cylindrical inner chambers, respectively, and which form axially-extending sealed working spaces by rotating in the corresponding cylindrical inner chambers; and M gate valves which are located outside the rotor assemblies in the corresponding cylindrical inner chambers, respectively, so that at least a region of an upper surface of each of the gate valves or at least a region of an upper surface of an extension of each of the gate valves is exposed in the corresponding pressure fluid chamber 11 and receives a force which is acted on the each gate valve towards an inside of a cylinder block by a pressure fluid in the corresponding pressure fluid chamber 11, wherein M>2, and in each cylinder block inner chamber, each of the gate valves has an end pressed against an outer surface of the corresponding rotor assembly, and successively switches between a retracted state and a protruded state, so that each of the gate valves is retracted in the corresponding gate valve groove when in the retracted state, and each of the gate valves is protruded from the corresponding gate valve groove to partition the corresponding axially-extending sealed working space into two variable volume piston spaces, i.e., a first piston space A and a second piston space B, when in the protruded state; and the M pressure fluid chambers are in communication with each other to form a sealed pressure fluid circulation path, and the M gate valves are configured in an interlocked drive relationship through the pressure fluid circulation path.

In accordance with a further aspect of the present disclosure, there is also provided a fluid motor. The fluid motor comprises: the abovementioned rotary device or rotary system. The first piston space A is in communication with a high-pressure fluid inlet through a first fluid passage 12 formed in the cylinder block on one side of the gate valve; and the second piston space B is in communication with a low-pressure fluid outlet through a second fluid passage 13 formed in the cylinder block on the other side of the gate valve.

In accordance with still another aspect of the present disclosure, there is also provided a compressor. The compressor comprises: the abovementioned rotary device or rotary system. The second piston space B is in communication with a low-pressure compression medium input opening through a second fluid passage 13 formed in the cylinder block on one side of the gate valve; and the first piston space A is in communication with a discharge opening for a high-pressure compression medium that has been compressed, through a first fluid passage 12 formed in the cylinder block on the other side of the gate valve.

In accordance with a still further aspect of the present disclosure, there is also provided a pump. The pump comprises: the abovementioned rotary device or rotary system. The first piston space A is in communication with a fluid inlet through a first fluid passage 12 formed in the cylinder block on one side of the gate valve; and the second piston space B is in communication with a fluid outlet through a second fluid passage 13 formed in the cylinder block on the other side of the gate valve.

In accordance with yet another aspect of the present disclosure, there is also provided an engine. The engine comprises: the abovementioned rotary device or rotary system. The first piston space A is in communication with a combustion chamber through a first fluid passage 12 formed in the cylinder block on one side of the gate valve; and the second piston space B is in communication with an exhaust gas discharge opening through a second fluid passage 13 formed in the cylinder block on the other side of the gate valve.

BRIEF DESCRIPTION OF THE DRAWINGS

The drawings are used to provide further understanding of the present invention and constitute a part of the description.

The present invention are explained by means of the drawings together with the following embodiments but should not be construed as being limited to the drawings and embodiments. In the accompanying drawings.

LIST OF REFERENCE SIGNS

Figure 1:
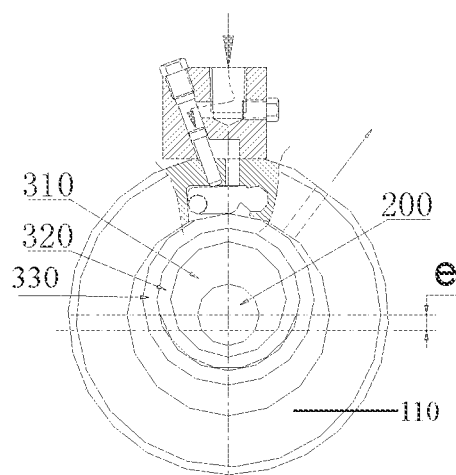
FIG. 1 is a sectional view of an eccentric rotor type rotation device in a prior art.

10—cylinder block;
11—pressure fluid chamber; 11a—fluid pipe joint; and 11b—pressure fluid flow hole;
12—first fluid passage; 12a—conduit region; and 12b—chamber region;
13—second fluid passage;
A—first piston space; and B—second piston space;
20—rotor assembly;
21—main rotor assembly; 22—left rotor assembly; and 23—right rotor assembly;
30—gate valve;
30a—seal strip;
31—gate valve body; and 32—column-shaped protrusion;
33—cylindrical roller;
40—gate valve resetting assembly;
41—guide pin bushing; and 42—resetting spring;
43—connecting bolt; and 44—straight-line guide way;
50—gland;
61—accumulator; and 62—pressure buffer.

DETAILED DESCRIPTION OF THE EMBODIMENTS

In order that the object, technical solutions and advantages of the present invention are more apparent and more readily appreciated, the present invention will be further described in detail in conjunction with embodiments with reference to the accompanying drawings as below.

It is to be noted that the same or similar elements are indicated by the same reference signs in the description or the drawings. Furthermore, in the drawings, a shape or a thickness in the embodiments may be enlarged for simplification and convenient indication. In addition, elements or implementing forms that are not described and shown in the drawings are those known by those skilled in the art. Further, although the present description may provide demonstrations of parameters including particular values, it should be understood that the parameters are unnecessarily exactly equal to the corresponding values, but may approximate the corresponding values within an acceptable tolerances or design constraints.

The present disclosure provides a corresponding fluid passage to introduce a pressure fluid in a variable volume space into a pressure fluid chamber above a gate valve. A pressure generated by the pressure fluid is used as a restoring force of the gate valve to control upward and downward movements of a gate valve plate, thereby substituting for the conventional mechanical driving mechanism and control mechanism.

In order that the object, technical solutions and advantages of the present invention are more apparent and more readily appreciated, the present invention will be further described in detail in conjunction with embodiments with reference to the accompanying drawings as below.

(A) First Embodiment

Figure 2:
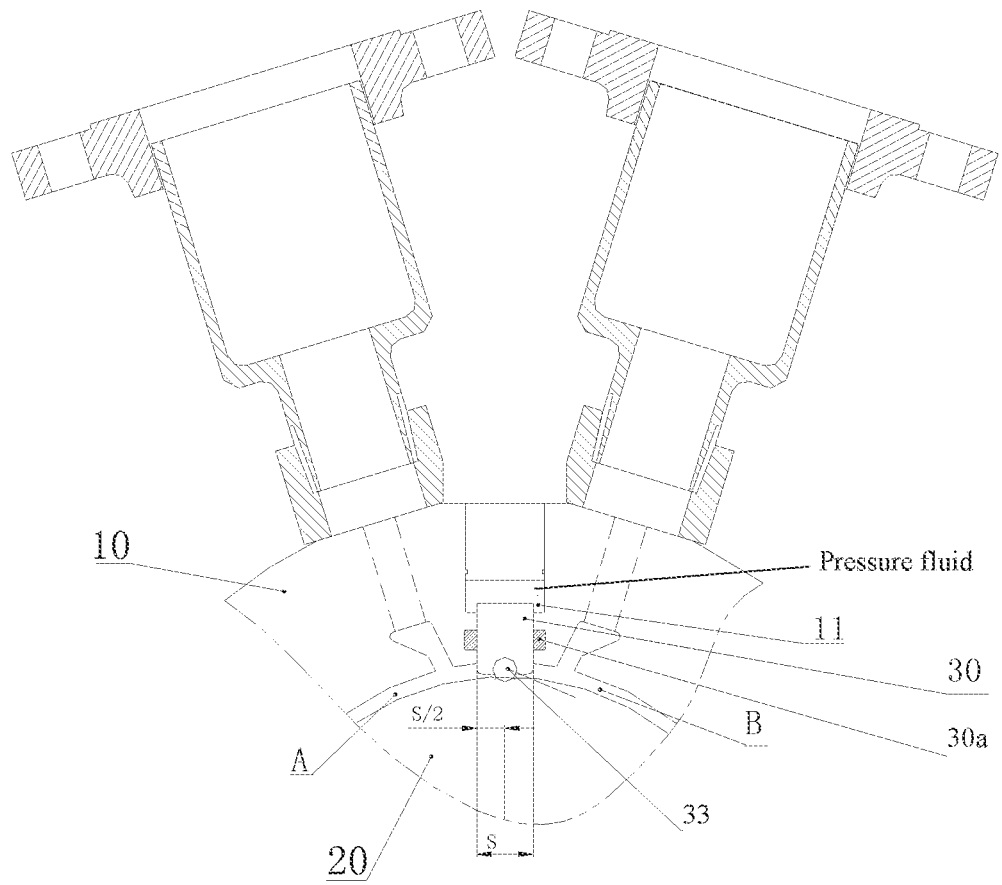
FIG. 2 is a schematic view of a rotary device with a press-actuated gate valve structure according to a first embodiment of the present disclosure.

FIG. 2 is a schematic view of a rotary device with a press-actuated gate valve structure according to a first embodiment of the present disclosure. Referring to FIG. 2 in combination of FIG. 1, a rotary device with a press-actuated gate valve structure according to the present embodiment comprises:

a cylinder block 10 which bounds a cylindrical inner chamber, which is formed with a gate valve groove on an inside of the cylinder block along a direction of a central axis of the cylindrical inner chamber, and which is formed with a pressure fluid chamber 11 on an outside of the gate valve groove;

a main shaft which is at least partly located in the cylindrical inner chamber, and has a central axis coinciding with a central axis of the cylindrical inner chamber;

a rotor assembly 20 which is fitted over a portion of the main shaft located in the cylindrical inner chamber, and which forms an axially-extending sealed working space by rotating in the cylindrical inner chamber; and a gate valve 30. At least a region of an upper surface of the gate valve is exposed in the pressure fluid chamber 11, and a force towards an inside of the cylinder block is applied to the gate valve by a pressure fluid in the pressure fluid chamber, such that an end of the gate valve is pressed against an outer surface of the rotor assembly, and the gate valve successively switches between a retracted state and a protruded state, so that the gate valve is retracted in the gate valve groove when in the retracted state, and the gate valve partitions the axially-extending sealed working space into two variable volume piston spaces, i.e., a first piston space A and a second piston space B, when in the protruded state.

These components of the rotary device with the gate valve structure according to the present embodiment will be described in detail hereinafter.

The cylinder block 10 comprises a cylinder block body, a front sealing end cover and a rear sealing end cover, which bound a cylindrical inner chamber together. The cylindrical inner chamber is a working region of the rotary device according to the present embodiment.

The main shaft is rotatably positioned and supported in a radial direction by the front and rear sealing end covers in the cylinder block, and has the central axis coinciding with the central axis of the cylindrical inner chamber. The main shaft transmits a torque between an outside and an inside of the cylindrical inner chamber. Taking a fluid motor as an example, a movement of a fluid in the cylindrical inner chamber is converted into a torque acting on the main shaft, and the torque is transmitted by the main shaft to the outside of the cylindrical inner chamber. Taking a compressor as an example, a torque inputted by an external power source is transmitted by the main shaft to the inside of the cylindrical inner chamber to drive the rotor assembly to move.

As shown in FIG. 2, the rotor assembly 20 is an eccentric rotor assembly. Referring to FIG. 1, the eccentric rotor assembly comprises: an eccentric crankshaft 310 which is fitted over a portion of the main shaft 200 located in the cylindrical inner chamber and has a central axis parallel to the central axis of the main shaft and offset from the central axis of the main shaft by a preset distance; a rolling piston wheel 330 which is fitted over the eccentric crankshaft 310, has a central axis coinciding with the central axis of the eccentric crankshaft, and rolls along an inner cylindrical surface of the cylinder block 110 to form a crescent sealed working space.

It is to be noted that although the eccentric rotor type rotor assembly is used in the present embodiment, the present disclosure is also applicable to the planetary revolution type rotor assembly in Chinese Patent Number CN103061822A. Those skilled in the art could clearly know the relationship between them, and thus it is no longer described in detail.

In addition, for the cylinder block, the main shaft, the rotor assembly, and the like, they have been described in detail in the patent applications of which the patent numbers are CN101864991A, CN103061822A, and CN 104100299A. previously filed by the applicant of the present invention, and structures of relevant components can be known by referring to these patent applications by those skilled in the art and are no longer described herein in detail.

A gate valve groove is formed in a preset position on an inside of the cylinder block along a direction of a central axis of the cylindrical inner chamber, to accommodate the gate valve in the retracted state. A shape of the gate valve groove is in correspondence with a shape of the gate valve. If the gate valve has a plate shape, the gate valve groove also has a corresponding plate shape. If the gate valve has a strip shape, the gate valve groove also has a corresponding strip shape. In the present embodiment, the gate valve 30 has a strip shape, and the gate valve groove also has a corresponding strip shape.

If the gate valve 30 and the gate valve groove cannot achieve a completely sealing fit therebetween, there will be a risk that the pressure fluid in the pressure fluid chamber 11 leaks to the sealed working space through a gap between the gate valve groove and the gate valve 30 to result in failure of driving of the gate valve.

In order to avoid this risk, referring to FIG. 2, seal strip grooves are also formed in a middle portion of the gate valve groove on both sides in a normal direction. Seal strips 30a are mounted in the two seal strip grooves. Whether the gate valve is in the retracted state or the protruded state, the seal strips 30a always tightly abut against the gate valve 30 to achieve an isolation of the pressure fluid chamber 11 from the sealed working space to the full.

There is the pressure fluid in the pressure fluid chamber 11. An upper portion of the gate valve is protruded into the pressure fluid chamber 11, and an upper surface of the gate valve receives a pressure F1 which is acted on the gate valve towards the cylindrical inner chamber side by the pressure fluid.

It is to be noted that the pressure F1 is only one among a plurality of forces received by the gate valve, and the plurality of forces will be described in detail in the following embodiments. However, as long as the pressure fluid chamber is formed on the outside of the gate valve groove, and the upper surface of the gate valve is exposed in the pressure fluid chamber and receives a force of the pressure fluid in the pressure fluid chamber towards the inside of the cylinder block, such embodiments are included within the protection scope of the present invention.

In addition, in the present embodiment, it is the upper surface of the gate valve that is exposed directly in the pressure fluid chamber. However, in other embodiments of the present disclosure, it may also be an extension of the gate valve that is protruded into the pressure fluid chamber and receives a force of the pressure fluid towards the inside of the cylinder block, and the force is transferred by the extension to the gate valve itself, such embodiments should also be included within the protection scope of the present invention.

In addition, for the pressure fluid chamber, if the pressure fluid is a gas, the pressure fluid chamber may be sealed, or may be in communication with another chamber. If the pressure fluid is a liquid, since the liquid is almost incompressible, the pressure fluid chamber can only be in communication with another chamber and the pressure fluid flows among these chambers, which will be described later.

In addition, the pressure fluid chamber is formed on the outside of the gate valve, and it is not necessary for the pressure fluid chamber to have a regular geometrical shape. The pressure fluid chamber may not be rectangular as in the present embodiment, and the present invention can be achieved as long as the pressure generated by the pressure fluid can be introduced to the upper surface of the gate valve.

In the present embodiment, the force F1 towards the inside of the cylinder block is applied to the gate valve by the pressure fluid in the pressure fluid chamber. Under the action of a resultant force including the force F1, a cylindrical roller at a distal end of the gate valve is abutted against the surface of the eccentric rotor assembly to apply a rolling force to the surface of the eccentric rotor assembly, thereby achieving a good seal while leaving out the complicated mechanical driving mechanism and control mechanism, simplifying the structure and improving the reliability.

(B) Second Embodiment

In the second embodiment of the present disclosure, there is provided a technical solution in which a pressure fluid in a piston space is introduced into a pressure fluid chamber.

As shown in FIG. 2, when the gate valve 30 is in the protruded state, it partitions an axially-extending sealed working space into two variable volume piston spaces, i.e., a first piston space A and a second piston space B. It is assumed that the first piston space A is a piston space in which a fluid pressure is greater.

In the present embodiment, the pressure fluid chamber 11 is connected to the first piston space through a fluid passage. The fluid passage may be a pipe disposed outside the cylinder block or a passage disposed inside the cylinder block. The fluid passage may be selected by those skilled in the art according to actual condition.

Figure 3:
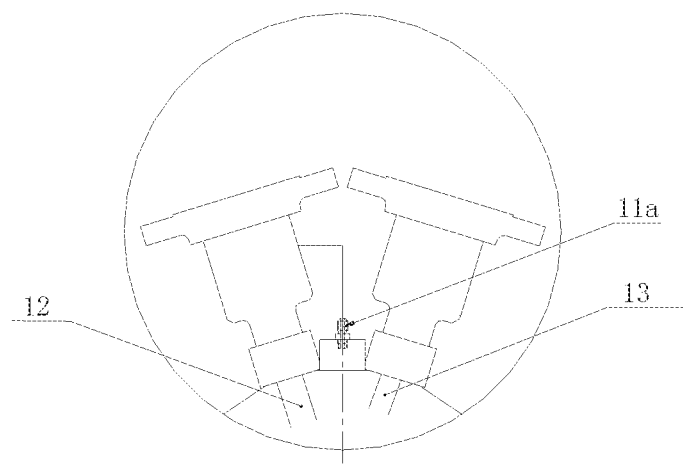
FIG. 3 is a schematic view of a rotary device with a press-actuated gate valve structure according to a second embodiment of the present disclosure.

As shown in FIG. 3, a first fluid passage 12 and a second fluid passage 13 are formed in the cylinder block on both sides of the gate valve, respectively. The first fluid passage 12 is connected to a flanged pipe of a fluid inlet, and is in communication with the first piston space A through a pipeline and a pipe joint 11a.

Figure 4A:
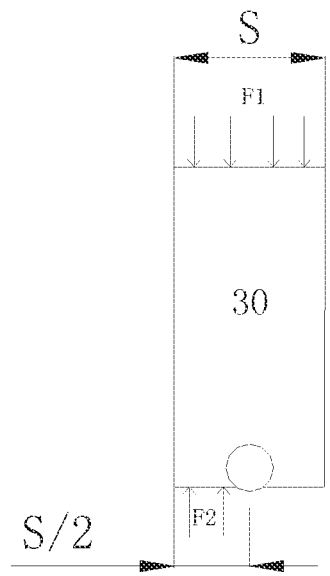
FIG. 4A and FIG. 4B are respectively schematic diagrams of forces received by the gate valve in the rotation device shown in FIG. 3 when a projected area, on a horizontal plane, of an area of an upper surface of the gate valve exposed in a fluid pressure chamber, and a projected area, on the horizontal plane, of a lower surface of the gate valve are equal and unequal to each other.

Referring to FIG. 4A, a projected area, on a horizontal plane (a tangent plane of the cylinder block), of an area of an upper surface of the gate valve exposed in a fluid pressure chamber, and a projected area, on the horizontal plane (the tangent plane of the cylinder block), of an area of a lower surface of the gate valve exposed in the sealed working space are equal to each other and both are S. The first piston space A and the pressure fluid chamber 11 are in communication with each other and pressures of fluids (gases or liquids) in them are P.

Forces received by the gate valve will be analyzed as below.

1. The fluid pressure in the first piston space A is introduced into the pressure fluid chamber in which the upper surface of the gate valve is located. A pushing force F1 towards the inside of the cylinder block is generated on the gate valve by the fluid in the pressure fluid chamber, and $F1=P \times S$.

2. With a line of contact between the cylindrical roller at the distal end of the gate valve and the eccentric rotor assembly as a boundary (a median line), on one side where the first piston space A is located, after the gate valve receives a working pressure P in the first piston space A, a force received by the gate valve so that the gate valve moves upwards is F2 and $F2=P \times S/2$; while on the other side where the second piston space B is located, a working pressure is small, and thus a force generated by the working pressure is negligible.

It can be clearly seen that F1 and F2 are opposite in direction and $F1=2F2$ so as to reliably ensure a sealing function of the gate valve in operation.

Figure 4B:
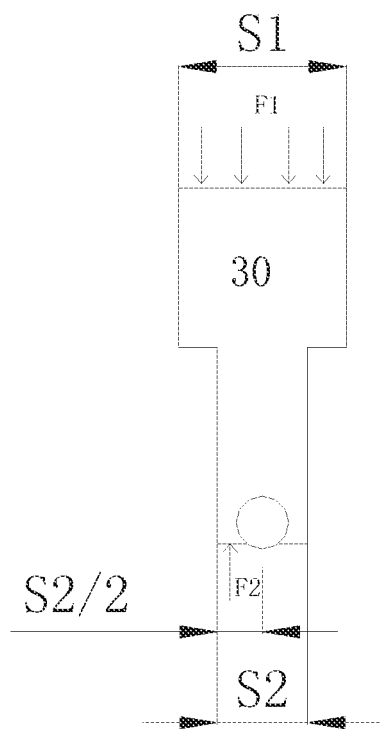

Referring to FIG. 4B, when the gate valve does not have a regular strip shape, the gate valve comprises a force receiving part and a flow blocking part connected together. The force receiving part and the flow blocking part each have a strip shape. A projected area, on the horizontal plane, of an area of an upper surface of the force receiving part exposed in the fluid pressure chamber 11 is $S_1$. A projected area, on the tangent plane of the cylinder block, of an area of the flow blocking part exposed in the sealed working space is $S_2$. $S_1 \neq S_2$.

Pressures of fluids (gases or liquids) in the first piston space A and the pressure fluid chamber 11 are P.

Forces received by the gate valve in this case will be analyzed as below.

1. A pushing force F1 towards the inside of the cylinder block is generated on the gate valve by the fluid in the pressure fluid chamber, and $F1=P \times S_1$.

2. After the gate valve receives the working pressure P in the pressure fluid chamber, a force received by the gate valve so that the gate valve moves upwards is F2 and $F2=P \times S_2/2$.

Therefore, a resultant force received by the gate valve so that the gate valve moves downwards is $F1-F2=P \times S_1 - P \times S_2/2 = P(S_1 - S_2/2)$. The resultant force should also be capable of ensuring a sealing function of the gate valve in operation as long as $S_2 < 2S_1$ is ensured.

In the present embodiment, the pressure fluid in one of the piston spaces is pumped into the pressure fluid chamber to apply a downward pressure to the upper surface of the gate valve sheet. As a result, the cylindrical roller at the distal end of the gate valve is abutted against the surface of the eccentric rotor assembly to apply the rolling force to the surface of the eccentric rotor assembly, thereby achieving a good seal while leaving out the complicated mechanical driving mechanism and control mechanism, simplifying the structure and improving the reliability.

(C) Third Embodiment

The rotary device with the gate valve structure shown in FIG. 3 has a problem that there is no pressure in each of the two piston spaces in an initial stage of an operation of the rotary device. In this case, there is also no pressure in the pressure fluid chamber. In this case, the gate valve cannot be reliably pressed against the surface of the eccentric rotor assembly. As a result, the rotary device cannot be started to operate.

Figure 5A:
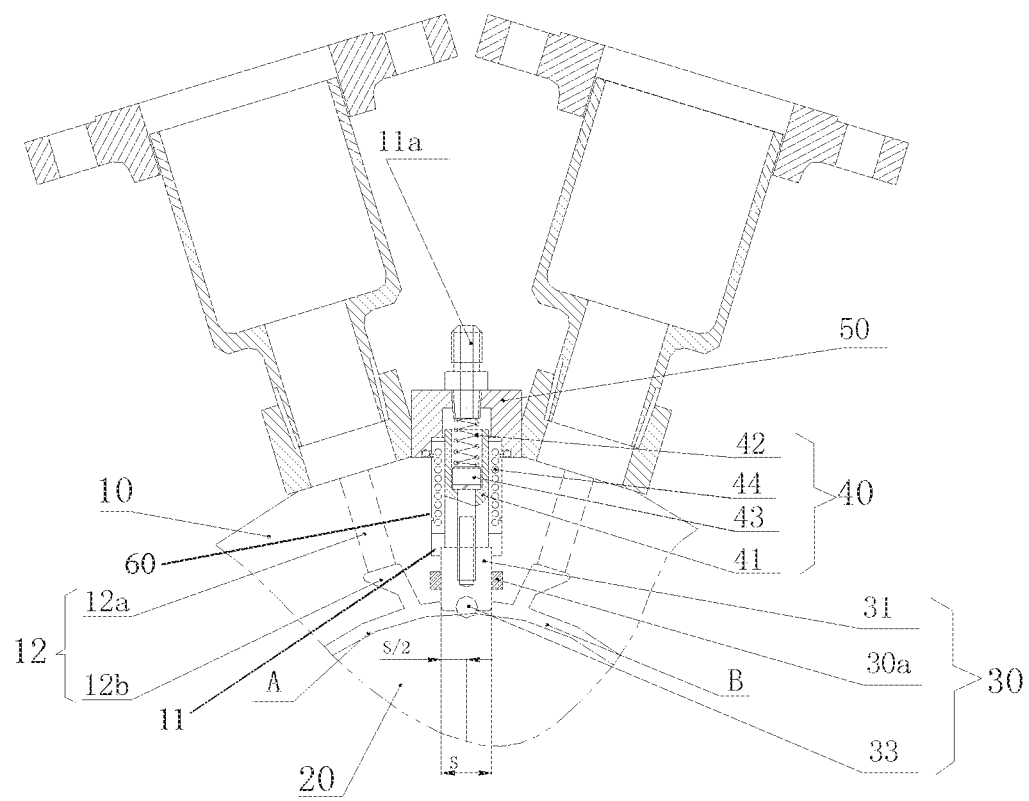
FIG. 5A is a sectional view of a rotary device according to a third embodiment of the present disclosure, which is taken in a position where a gate valve resetting assembly is located.
Figure 5B:
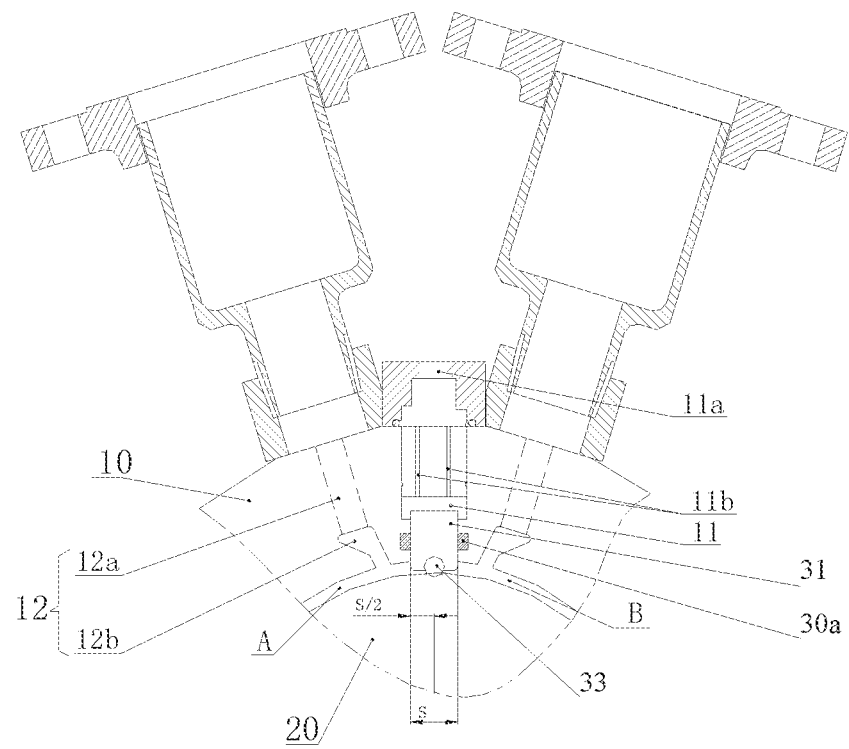
FIG. 5B is a sectional view of the rotary device shown in FIG. 5A, which is taken in a position where the gate valve resetting assembly is not located.
Figure 5C:
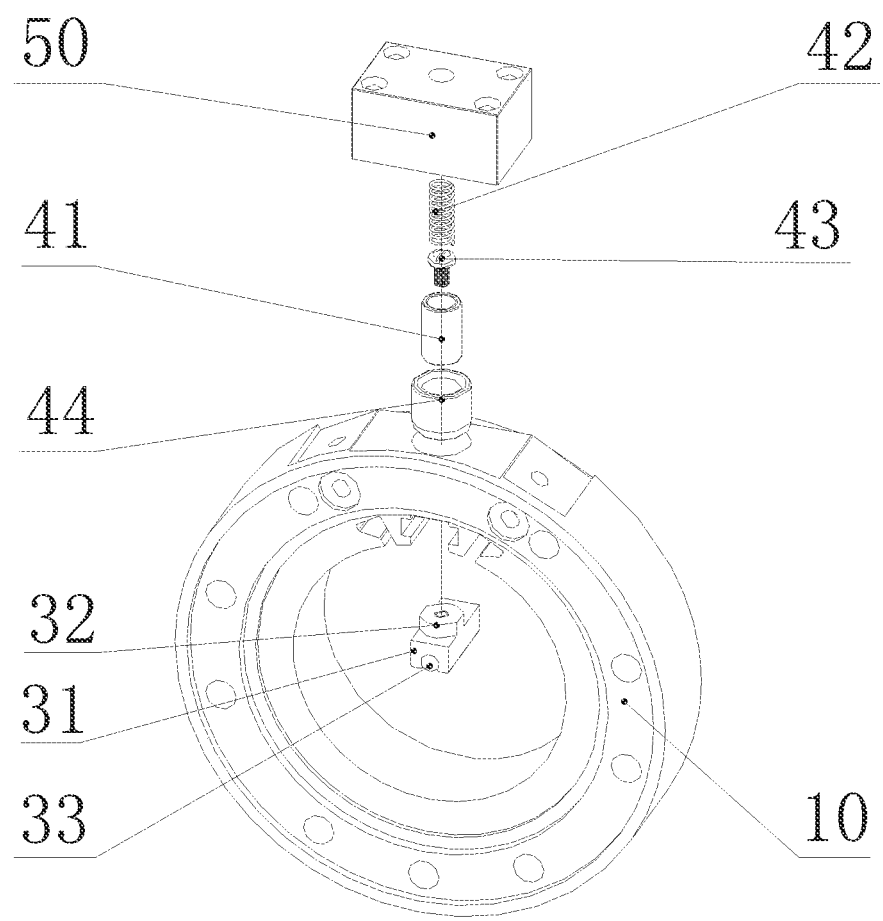
FIG. 5C is a schematic exploded view of a part of the rotary device shown in FIG. 5A, where the gate valve resetting assembly is located.

In order to overcome the above problem, the present disclosure also provides another rotary device with a gate valve structure based on the second embodiment. In the rotary device, a gate valve resetting assembly will be introduced to solve the above problem. FIG. 5A is a sectional view of the rotary device according to the third embodiment of the present disclosure, which is taken in a position where the gate valve resetting assembly is located. FIG. 5B is a sectional view of the rotary device shown in FIG. 5A, which is taken in a position where the gate valve resetting assembly is not located. FIG. 5C is a schematic exploded view of a part of the rotary device shown in FIG. 5A, where the gate valve resetting assembly is located.

Referring to FIG. 5B, the pressure fluid chamber 11 is formed on a radial outside of the gate valve groove.

Referring to FIG. 5A, at least one resetting assembly mounting hole 60 is formed in the cylinder block on a radial outside of the pressure fluid chamber 11. A gate valve resetting assembly 40 is mounted in the resetting assembly mounting hole 60, and a resetting force towards the inside of the cylinder block is applied to the gate valve 30 or the extension of the gate valve by the gate valve resetting assembly 40. The resetting assembly mounting hole 60 comprises a plurality of resetting assembly mounting holes, and the corresponding gate valve resetting assembly 40 comprises a plurality of gate valve resetting assemblies, and these resetting assembly mounting holes are formed in the cylinder block at symmetrical positions, so that forces applied to the gate valve by the gate valve resetting assemblies in the resetting assembly mounting holes are symmetrical. The resetting assembly mounting holes are formed in the cylinder block in left-right symmetrical positions, respectively, so that forces applied to the gate valve by the gate valve resetting assemblies in the resetting assembly mounting holes are left-right symmetrical and will not deviate laterally.

The gate valve resetting assembly 40 is disposed in the resetting assembly mounting hole. A resetting force towards the inside of the cylinder block is applied to the gate valve 30 by the gate valve resetting assembly 40, so that the gate valve 30 can also be pressed against the outer surface of the rotor assembly without the pressure applied to the gate valve 30 by the pressure fluid chamber 11.

A gland 50, opening downwards, is tightly fixed above the resetting assembly mounting hole on the outside of the cylinder block. For a sealing manner between the gland 50 and the cylinder block, an O-ring rubber seal, a copper gasket or the like may be used.

A fluid exchanging space is formed under the gland 50. The fluid pipe interface 11a is disposed on the gland. The fluid exchanging space communicates with the first piston space A outwards through the pipe interface 11a and a corresponding fluid passage, and the first fluid passage 12. The fluid exchanging space communicates with the pressure fluid chamber 11 towards the inside of the cylinder block.

Referring to FIG. 5B, a plurality of pressure fluid flow holes lib, communicating the pressure fluid chamber 11 with the fluid exchanging space under the gland, are also formed in a periphery of the resetting assembly mounting hole. Through the pressure fluid flow holes lib, the pressure fluid flows into the pressure fluid chamber 11 from the fluid exchanging space under the gland. The gland 50 tightly isolates the fluid exchanging space, the resetting assembly mounting hole, the pressure fluid flow holes lib, and the pressure fluid chamber 11 from a space located outside the cylinder block.

A specific gate valve resetting assembly 40 will be given as below.

Referring to FIG. 5B and FIG. 5C, the gate valve resetting assembly 40 comprises: a guide pin bushing 41 located in the resetting assembly mounting hole, having a lower closed end, and opening upwards; a resetting spring 42 having a lower end abutting against a bottom of the guide pin bushing, partially located in the guide pin bushing, and having an upper end fixed to a lower surface of the gland; a connecting bolt 43 having an upper portion fixed to the bottom of the guide pin bushing 41, and a lower portion connected to an upper portion of the gate valve 30; and a straight-line guide way 44 disposed between the resetting assembly mounting hole and the guide pin bushing 41 and configured to guide a direction of movement of the guide pin bushing 41 along the resetting assembly mounting hole.

A pressure fluid above the guide pin bushing 41 may flow to the pressure fluid chamber 11 through a gap between the guide pin bushing 41 and the straight-line guide way 44, a clearance around the straight-line guide way, and a clearance of the straight-line guide way itself. In this case, the gap, the clearances and the like serve as the pressure fluid flow hole. If the fluid is small in amount, the fluid may flow only by means of the gap and the clearances. If the fluid is large in amount, a special fluid flow hole needs to be formed in a periphery of the resetting assembly mounting hole.

If the gate valve resetting assembly 40 is added, the gate valve further receives a resetting force F3 which moves the gate valve downwards, in addition to F1 and F2 mentioned in the first embodiment. Therefore, a resultant force received by the gate valve so that the gate valve moves downwards is $F1+F3-F2=P \times S_1+F3-P/2 \times S_2=P(S_1-S_2/2)+F3$.

It should be appreciated by those skilled in the art that when an inertial force f generated due to an upward movement of the rotor assembly and received by the gate valve is excessively large, i.e. $f>P(S1-S2/2)+F3$, a bottom of the gate valve is moved upwards to be separated from a planetary wheel piston surface, so that not only the sealing fails, but vibration and noise will also be generated. The inertial force f received by the gate valve so that the gate valve moves upwards is from a pushing force acting on the gate valve by the eccentric rotor assembly when rotating at a high speed. It is one of keys needed to be noted in design to correctly select, according to the pushing force acting on the gate valve by the eccentric rotor assembly when rotating at the high speed, the resetting spring force F3 moving the gate valve downwards and needed by the gate valve, so that F3>f.

In addition, referring to FIG. 5C, the gate valve 30 comprises: a gate valve body 31 having a strip shape; and a column-shaped protrusion 32 formed at an upper portion of the gate valve body and corresponding in position to the connecting bolt. In assembling, the connecting bolt 43 is connected to the column-shaped protrusion 32.

The column-shaped protrusion is fixedly connected to a lower portion of the guide pin bushing 41 through the bolt 43, and the other area of an upper surface of the gate valve block than the column-shaped protrusion is exposed in the pressure fluid chamber and receives a force acting towards the inside of the cylinder block by a pressure fluid in the pressure fluid chamber.

In addition, it should be noted that in order to reduce a friction between the gate valve 30 and the rotor assembly 20, the cylindrical roller 33 is disposed at the distal end of the gate valve.

It should also be noted that shapes of a fluid inlet passage and a fluid outlet passage are also optimized in the present disclosure. Referring to FIGS. 5A and 5B, the first fluid passage 12 is divided into two regions, i.e. an outside conduit region 12a, and an inside chamber region 12b. The conduit region 12a is a radial through hole. Since allowable ranges of a flow rate and a flow velocity are different, it must be ensured that there is a sufficient space for its layout in manufacturing and assembling.

It is required for a function of the chamber region 12b that the chamber region 12b is formed into an inverted horseshoe shape extending along an axial direction of the cylinder block, wider at top and narrower at bottom, while the flow rate and the flow velocity are ensured. To be wider at top facilitates an abutment of the chamber region against a bottom of the radial conduit region, while to be narrower at bottom facilitates an arrangement of the chamber region in the proximity of either side of the gate valve, increasing an effective working angle of the eccentric rotor assembly.

The second fluid passage 13 and the first fluid passage 12 are symmetrical in shape. Thus, the cylinder block having a Y-shaped inner chamber may be called a Y type cylinder block.

In addition, in the present embodiment, a common mechanical spring is used to achieve resetting of the gate valve. However, in other embodiments of the present disclosure, a nitrogen gas spring or a magnetic spring may also be used. Both of them can achieve the present invention.

(D) Fourth Embodiment

A pressurization of a fluid having a constant pressure and a constant flow rate is a necessary condition for a stable operation of the gate valve with a low noise. Thus, an accumulator and/or a pressure buffer may be used in a hydraulic system loop so that a pulsation of a pressure of a liquid can be reduced.

Figure 6:
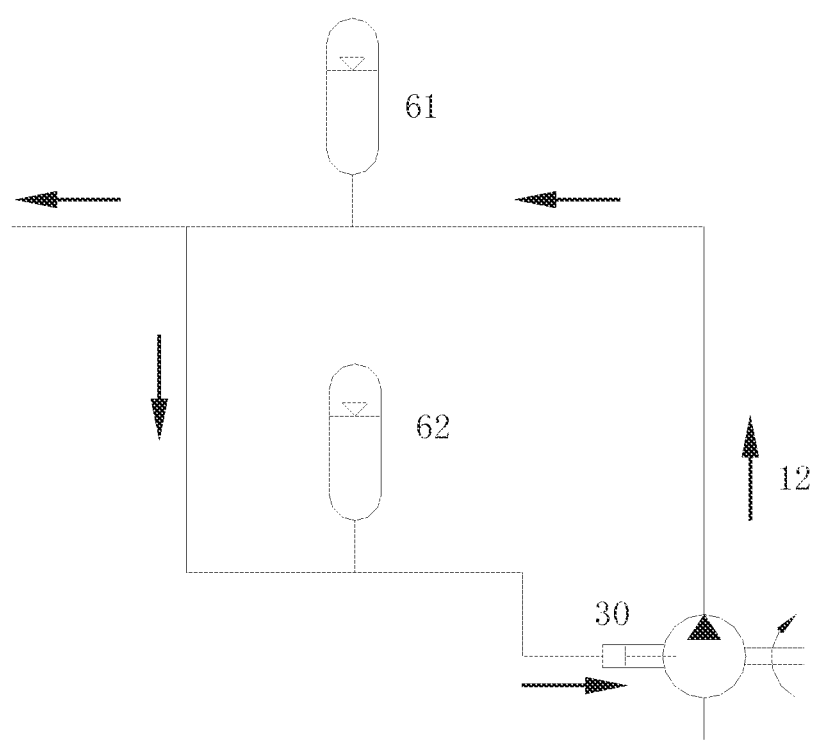
FIG. 6 is a schematic diagram of a rotary device, in which an accumulator and a pressure buffer are mounted to a fluid path, according to a fourth embodiment of the present disclosure.

In the fourth embodiment of the present disclosure, there is also provided a rotary device. Referring to FIG. 6, the rotary device according to the present embodiment further comprises: at least one accumulator 61 disposed in a main liquid discharge loop of a pump, thereby alleviating and eliminating phenomena of nonuniformity and pulsation of a flow rate of the fluid pumped from the first piston space A and thus stabilizing a pressure in the main liquid discharge loop. A pressure buffer 62 is disposed in a back-pressure bypass leading to the gate valve, thereby more uniformly transmitting a pressure fluid in the first piston space A to the pressure fluid chamber on a back side of the gate valve.

For the accumulator and the pressure buffer, they have been widely used in the field of fluid machinery. For example, the accumulator comprises a bag type accumulator, a diaphragm accumulator, a weight-loaded accumulator and the like, while the pressure buffer comprises a gas buffer. They will be no longer described herein in detail.

It should be noted that in the present embodiment, one gate valve resetting assembly is disposed. However, if the gate valve has a longer length in the axial direction, a plurality of gate valve resetting assemblies may be left-right symmetrically mounted to the cylinder block to ensure reliably resetting of the gate valve.

(E) Fifth Embodiment

In the fifth embodiment of the present disclosure, there is provided a rotary system based on a multiple-cylinder type rotary device in Chinese Patent Number CN106151025.

Figure 7:
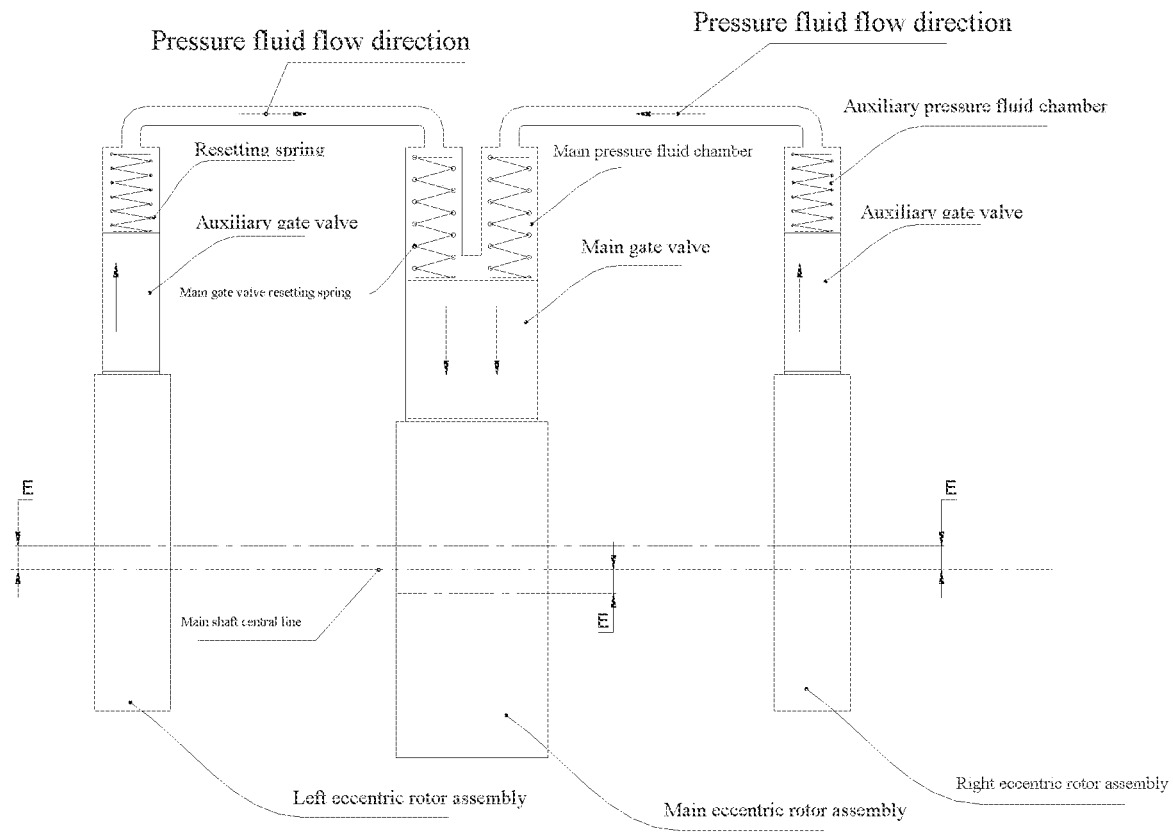
FIG. 7 is a schematic diagram of a gate valve and a relevant part of a three-cylinder rotary system to which a press-actuated gate valve mechanism is applied, according to a fifth embodiment of the present disclosure.

FIG. 7 is a schematic diagram of a part, where the gate valve is located, of a multiple-cylinder type rotary system to which a press-actuated gate valve mechanism is applied, according to a fifth embodiment of the present disclosure. Referring to FIG. 7, the rotary system comprises: a cylinder block inner chamber, a main shaft, three rotor assemblies, and three gate valves.

The cylinder block inner chamber is partitioned into three independent cylindrical inner chambers: a left chamber, a main chamber and a right chamber. A gate valve groove is formed on an outside of each of the chambers, and a pressure fluid chamber is formed on an outside of each of the gate valve grooves. The main shaft has a central line coinciding with a central line of the cylinder block inner chamber, and passes through the left chamber, the main chamber and the right chamber in sequence.

A main eccentric rotor assembly, a left eccentric rotor assembly, and a right eccentric rotor assembly are located inside the corresponding chambers, respectively, are each fitted over a portion of the main shaft located in the corresponding chamber, and forms an axially-extending sealed working space by rotating in the corresponding chamber. Each of the main, left and right eccentric rotor assemblies has an eccentric distance of E.

The gate valve is disposed on an outside of each of the rotor assemblies in correspondence with each chamber. At least a region of an upper surface of the gate valve is exposed in the corresponding pressure fluid chamber, and a force towards an inside of the cylinder block is applied to the gate valve by a pressure fluid in the pressure fluid chamber, such that an end of the gate valve is pressed against an outer surface of the rotor assembly, and the gate valve successively switches between a retracted state and a protruded state. The main chamber corresponds to a main gate valve, while the left and right chambers correspond to auxiliary gate valves.

In the present embodiment, the pressure fluid chamber corresponding to the main gate valve is connected to the pressure fluid chambers for the auxiliary gate valves on both sides through a pipeline. Flow directions of liquids pumped by the pressure fluid chambers relate to ascending and ascending stroke movements of the eccentric rotor assemblies. The pressure fluid chamber corresponding to the main gate valve and the pressure fluid chambers corresponding to the auxiliary gate valves on both sides form a sealed pressure fluid circulation path.

Referring to FIG. 7, a difference between a phase of the gate valve of the main rotary device and a phase of the gate valves of the auxiliary rotary devices on both sides is 180°. When the gate valve of the main rotary device is in the protruded state, the gate valves of the two auxiliary rotary devices are in the retracted state. When the gate valve of the main rotary device is in the retracted state, the gate valves of the two auxiliary rotary devices are in the protruded state. A fluid in the circulation path circulates and flows between the pressure fluid chamber of the main gate valve mechanism and the pressure fluid chambers of the auxiliary gate valves mechanisms on both sides as shown in FIG. 7.

Hydraulic pressures generated by piston movements of the gate valves have a delicate interlocking drive relation to help driving of the gate valves of each other. The fluid pressure generated by the movement of the main gate valve drives the two auxiliary gate valves to move, while the fluid pressures generated by the movements of the two auxiliary gate valves drive the main gate valve to move.

In addition, in the present embodiment, the gate valve resetting mechanism shown in FIG. 5A to FIG. 5C is not used, but only a resetting spring is used to achieve resetting of the gate valve. Referring to FIG. 7, the resetting spring has an upper portion abutting against an upper wall of the pressure fluid chamber, and a lower portion abutting against the upper surface of the gate valve.

It should be noted that the technical solution of the present embodiment is also applicable to the rotary system mentioned in Chinese Patent Number CN106151025. The rotary system comprises: a cylinder block inner chamber partitioned into 2N+1 cylindrical inner chambers including 1 main chamber, N left chambers, and N right chambers; a main shaft which has a central line coinciding with a central line of the cylinder block inner chamber, and passes through the 2N+1 cylindrical inner chambers in sequence; and 2N+1 eccentric rotor assemblies each of which is fitted over a portion of the main shaft located in the corresponding chamber, and forms an axially-extending sealed working space by rotating in the corresponding chamber. The chamber and the rotary mechanism in the chamber constitute a rotary device. N>1. The gate valve is disposed on an outside of each of the rotor assemblies in correspondence with each cylinder block inner chamber. At least a region of an upper surface of the gate valve is exposed in the corresponding pressure fluid chamber.

Similar to FIG. 7, a difference between a phase of the 2N auxiliary rotor assemblies and a phase of the main rotor assembly is 180°. The pressure fluid chamber corresponding to the main gate valve is connected to the pressure fluid chambers corresponding to the 2N auxiliary gate valves on both sides through a pipeline, to form a sealed pressure fluid circulation path together. The main gate valve and the 2N auxiliary gate valves are configured in an interlocked drive relationship through the pressure fluid circulation path. Specifically, the fluid pressure generated by the movement of the main gate valve drives the 2N auxiliary gate valves to move, while the fluid pressures generated by the movements of the 2N auxiliary gate valves drive the main gate valve to move.

Figure 8:
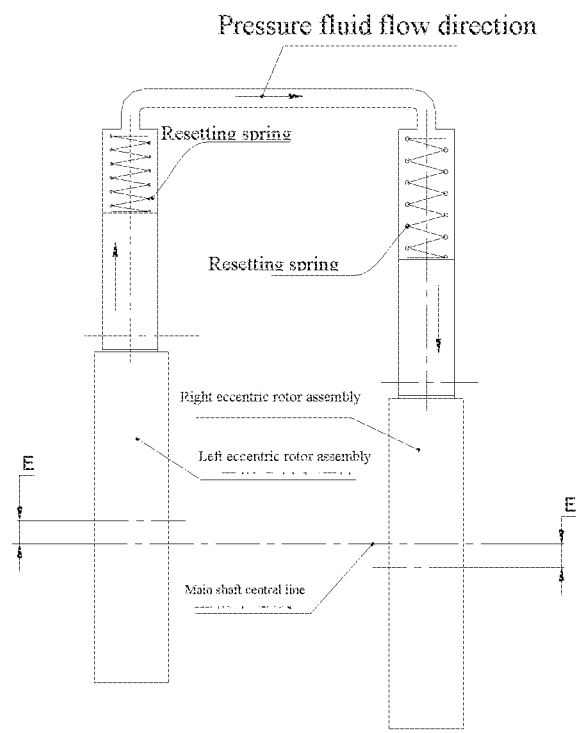
FIG. 8 is a schematic diagram of a gate valve and a relevant part of a two-cylinder rotary system to which a press-actuated gate valve mechanism is applied, according to an embodiment of the present disclosure.

In addition, the technical solution of the present embodiment is also applicable to a rotary system comprising two rotary devices. Referring to FIG. 8, the rotary system comprises: a cylinder block inner chamber partitioned into two cylindrical inner chambers: a left chamber and a right chamber; a main shaft which has a central line coinciding with a central line of the cylinder block inner chamber, and passes through the left chamber and the right chamber in sequence; and two eccentric rotor assemblies each of which is fitted over a portion of the main shaft located in the corresponding chamber, and forms an axially-extending sealed working space by rotating in the corresponding chamber. The chamber and the rotary mechanism in the chamber constitute a rotary device. Each of the left and right eccentric rotor assemblies has an eccentric distance of E, and a difference between phases of the two eccentric rotor assemblies is 180°.

Likewise, the gate valve is disposed on an outside of each of the rotor assemblies in correspondence with each cylinder block inner chamber. At least a region of an upper surface of the gate valve is exposed in the corresponding pressure fluid chamber, and a force towards an inside of the cylinder block is applied to the gate valve by a pressure fluid in the pressure fluid chamber.

As shown in FIG. 8, the pressure fluid chamber corresponding to the left rotor assembly is connected to the pressure fluid chamber corresponding to the right rotor assembly through a pipeline, to form a sealed pressure fluid circulation path together. The left gate valve and the right gate valve are configured in an interlocked drive relationship through the pressure fluid circulation path. Specifically, a fluid pressure generated by a movement of the left gate valve drives the right gate valve to move, while a fluid pressure generated by a movement of the right gate valve drives the left gate valve to move.

As a generalized application, the technical solution of the present disclosure is applicable to a rotary system comprising M rotary devices. As long as the fluid pressure chambers corresponding to the M gate valves in the M rotary devices are in communication with one another to form a sealed pressure fluid circulation path, and the M gate valves are configured in an interlocked drive relationship through the pressure fluid circulation path, cooperation of the plurality of gate valves can be achieved in an untiming system, thereby greatly simplifying a mechanical structure.

(F) Sixth Embodiment

The present embodiment provides a fluid motor based on the rotary devices in the above four embodiments.

The fluid motor comprises the abovementioned rotary device, and in the rotary device, the first piston space A is in communication with a high-pressure fluid inlet through the first fluid passage 12; and the second piston space B is in communication with a low-pressure fluid outlet through the second fluid passage 13. A high-pressure fluid drives the eccentric rotor assembly to rotate, so that a generated torque is transmitted to an outside of the cylindrical inner chamber by means of the main shaft.

In the present embodiment, the fluid may be gas or liquid, including steam or other thermal energy gases. The fluid motor may be fluid motors that are applied to fields such as traffic and transportation, power engineering, industrial machinery, and the like. For example, a steam engine may be used in nuclear-powered equipment, while hydraulic and pneumatic motors may be used in vehicle and ship industries.

It must be pointed out that the fluid motor according to the embodiments is particularly suitable for situations in which a small volume, a light weight, a great power and a long service life are needed because of a mechanical amplification function of the pressure fluid and high efficiency and high reliability of the rolling rotor piston.

(G) Seventh Embodiment

The present embodiment provides a compressor based on the rotary devices in the above four embodiments. In the compressor, the second piston space B is a suction chamber which is in communication with a low-pressure compression medium input opening through the second fluid passage 13; and the first piston space A is a compression chamber, i.e. a high-pressure chamber, which is in communication with a discharge opening for a high-pressure compression medium that has been compressed, through the first fluid passage 12. A torque on an outside of the cylindrical inner chamber is transmitted to an inside of the cylindrical inner chamber by the main shaft, so that the compression medium is compressed by means of the eccentric rotor assembly.

The compressor may be compressors for a household air conditioner, a refrigerator, a freezer, and the like, or a compressor for industrial refrigeration equipment. The fluid may be a refrigerant such as Freon or the like.

(H) Eighth Embodiment

The present embodiment provides a pump based on the rotary devices in the above four embodiments.

In the pump, the first piston space A is in communication with a fluid inlet through the first fluid passage 12; and the second piston space B is in communication with a fluid outlet through the second fluid passage 13. A torque on an outside of the cylindrical inner chamber is transmitted to an inside of the cylindrical inner chamber by the main shaft. The eccentric rotor assembly is driven by the main shaft to roll forwards along the cylindrical inner chamber, so as to pump a fluid entering from the fluid inlet into a crescent sealed working space and discharge the fluid through the fluid outlet.

Likewise, in the present embodiment, the fluid may be gas or liquid. The pump may be pumps that are applied to fields in which a large flow rate is required, such as water conservancy, fire fighting, water supply engineering, and the like.

(I) Ninth Embodiment

The present embodiment provides an engine based on the rotary devices in the above four embodiments.

The engine comprises the abovementioned rotary device, and in the rotary device, the first piston space A is in communication with a combustion chamber through the first fluid passage 12; and the second piston space B is in communication with an exhaust gas discharge opening through the second fluid passage 13. A high-pressure gas entering from the combustion chamber drives the eccentric rotor assembly to roll along the cylindrical inner chamber, and the eccentric rotor assembly drives the main shaft to rotate, so that a generated torque is transmitted to an outside of the cylindrical inner chamber by means of the main shaft.

Likewise, in the present embodiment, the fluid may be gas, and the engine may be engines that are applied to fields such as an internal-combustion engine, an external-combustion engine or the like.

So far, the eight embodiments of the present disclosure have been described in detail in conjunction with the accompanying drawings. According to the above description, those skilled in the art would clearly understand the rotary device and the fluid machinery of the present disclosure, to which the press-actuated gate valve mechanism is applied.

It should be noted that implementing forms that are not shown or described in the drawings or the description are those known by those skilled in the art and are not described in detail. In addition, the above definitions of elements and methods are not limited to the specific structures, shapes or methods mentioned in the embodiments, and may be simply modified or substituted by those skilled in the art. For example, (1) in addition to the straight-line guide way, other types of guides such as a slide sleeve or the like may be used to constrain a movement direction of the guide pin bushing;

(2) the resetting spring may be replaced with a nitrogen gas spring, a magnetic spring, or the like;

(3) the terms for indicating orientations, such as "upper", "lower", "front", "rear", "left", "right" and the like, mentioned in the embodiments are used for only referring to the orientations in the figures, and are not used to limit the protection scope of the present invention; and (4) the abovementioned embodiments may be mixed and combined with one another or with other embodiments based on considerations of design and reliability. In other words, the technical features in different ones of the embodiments may be freely combined to form more embodiments.

It can be seen from the above technical solutions that the rotary device and the fluid machinery of the present disclosure, to which the press-actuated gate valve mechanism is applied, have the following advantageous effects.

1. The pressure fluid chamber is disposed above the gate valve so that an action of the gate valve is controlled by means of a fluid pressure, thereby leaving out the mechanical driving mechanism and control mechanism of the gate valve. As a result, the rotary device and the fluid machinery are simple in structure, high in reliability and maintainability, and low in cost.

2. In an aspect of the embodiments, a pressure fluid in one, in which a fluid pressure is greater, of the piston spaces is introduced into the pressure fluid chamber above the gate valve. A pressure generated by the pressure fluid is used as a restoring force of the gate valve, thereby greatly simplifying a mechanical structure.

3. In another aspect of the embodiments, cooperation among a plurality of gate valves is achieved in an untiming system, in combination with a multiple-cylinder rotary device, thereby greatly simplifying a mechanical structure.

In summary, in the present disclosure, the pressure fluid chamber is disposed above the gate valve so that an action of the gate valve is controlled by means of a fluid pressure, thereby leaving out the mechanical driving mechanism and control mechanism of the gate valve. As a result, the rotary device and the fluid machinery is simple in structure, high in reliability, low in cost, and wide in application prospect.

The object, technical solutions, and advantageous effect of the present disclosure are further described in detailed in the above specific embodiments. It should be appreciated that the above description is only specific embodiments of the present disclosure and the embodiment is not used to limit the present invention. It will be understood by those skilled in the art that various modifications, equivalent substitutions and improvements may be made therein without departing from the principles and spirit of the present invention and fall within the scope of the present invention.

What is claimed is:

1. A rotary device with a press-actuated gate valve structure, comprising:
a cylinder block which bounds a cylindrical inner chamber, is formed with a gate valve groove on an inside of the cylinder block along a direction of a central axis of the cylindrical inner chamber, and is formed with a pressure fluid chamber on an outside of the gate valve groove;
a rotor assembly which forms an axially-extending sealed working space inside the cylindrical inner chamber by rotating in the cylindrical inner chamber; and
a gate valve mounted outside the rotor assembly, so that at least a region of an upper surface of the gate valve or at least a region of an upper surface of an extension of the gate valve is exposed in the pressure fluid chamber and receives a force which is acted on the gate valve towards an inside of the cylinder block by a pressure fluid in the pressure fluid chamber, wherein:
the gate valve has an end pressed against an outer surface of the rotor assembly, and successively switches between a retracted state and a protruded state, so that the gate valve is retracted in the gate valve groove when in the retracted state, and the gate valve is protruded from the gate valve groove to partition the axially-extending sealed working space into a first piston (A) and a second piston (B), each of which has a variable volume, when in the protruded state,
the pressure fluid is a liquid or a gas, and when the pressure fluid is a liquid, the pressure fluid chamber is in communication with a pressure fluid supply source, and when the pressure fluid is a gas, the pressure fluid chamber is sealed, or is in communication with a pressure fluid supply source,
the pressure fluid chamber communicates with one, in which a fluid pressure is greater, of the first piston space (A) and the second piston space (B), and the one of the first piston space (A) and the second piston space (B) serves as the pressure fluid supply source,
at least one resetting assembly mounting hole is formed in the cylinder block on a radial outside of the pressure fluid chamber,
a gate valve resetting assembly is mounted in the resetting assembly mounting hole, and a resetting force towards the inside of the cylinder block is applied to the gate valve or the extension of the gate valve by the gate valve resetting assembly,
a gland, opening downwards, is tightly fixed above the resetting assembly mounting hole on the outside of the cylinder block,
a fluid exchanging space is formed under the gland, and the fluid exchanging space communicates with the pressure fluid supply source, and communicates with the pressure fluid chamber,
the gate valve resetting assembly comprises:
a guide pin bushing located in the resetting assembly mounting hole, and opening upwards;
a resetting spring having a lower end abutting against a bottom of the guide pin bushing, and an upper end fixed to a lower surface of the gland;
a connecting bolt having an upper portion fixed to the bottom of the guide pin bushing, and a lower portion extending into the pressure fluid chamber and connected to an upper portion of the gate valve or an upper portion of the extension of the gate valve; and
a straight-line guide way disposed between the guide pin bushing and the resetting assembly mounting hole on an outside of the guide pin bushing and configured to guide a direction of movement of the guide pin bushing.

2. The rotary device of claim 1, wherein:
seal strip grooves are formed in a middle portion of the gate valve groove on both sides in a normal direction; and
seal strips are mounted in the two seal strip grooves, and the two seal strips abut against both sides of the gate valve to achieve an isolation of the pressure fluid chamber from the sealed working space.

3. The rotary device of claim 1, wherein:
the gate valve:
has a strip shape; or
comprises: a force receiving part and a flow blocking part which are integrated, wherein the force receiving part and the flow blocking part each have a strip shape, a projected area, on a tangent plane of the cylinder block, of an area of an upper surface of the force receiving part exposed in the fluid pressure chamber is S1, a projected area, on the tangent plane of the cylinder block, of an area of the flow blocking part exposed in the sealed working space is S2, and S2<2S1.

4. The rotary device of claim 1, further comprising:
a resetting spring which has a fixed upper end, and a lower end pressed against the upper surface of the gate valve or the upper surface of the extension of the gate valve, and which directly or indirectly applies a force towards the inside of the cylinder block to the gate valve.

5. The rotary device of claim 1, wherein:
the pressure fluid chamber is in communication with the pressure fluid supply source; and
at least one of an accumulator and a pressure buffer is disposed between the pressure fluid chamber and the pressure fluid supply source, so that a pressure fluid supplied by the pressure fluid supply source is more uniformly transmitted to the pressure fluid chamber.

6. The rotary device of claim 1, wherein:
the fluid exchanging space communicates with the pressure fluid chamber through at least one of the resetting assembly mounting hole or a pressure fluid flow hole formed in a periphery of the resetting assembly mounting hole.

7. The rotary device of claim 1, wherein:
the gate valve comprises: a gate valve body; and a column-shaped protrusion formed at an upper portion of the gate valve body;
wherein the column-shaped protrusion is connected to a lower portion of the connecting bolt, and the other area of an upper surface of the gate valve body than the column-shaped protrusion is exposed in the pressure fluid chamber and receives a force acting on the gate valve body towards the inside of the cylinder block by a pressure fluid in the pressure fluid chamber.

8. The rotary device of claim 1, wherein:
the first piston space (A) and the second piston space (B) are in communication with a first fluid passage and a second fluid passage formed in the cylinder block on both sides of the gate valve, respectively; and
at least one of the first fluid passage and the second fluid passage comprises an outside conduit region and an inside chamber region, wherein the inside chamber region has an inverted horseshoe shape extending along an axial direction of the cylinder block, and being wide at top and narrow at bottom.

9. The rotary device of claim 1, further comprising:
a main shaft which is at least partly located in the cylindrical inner chamber, and has a central axis coinciding with a central axis of the cylindrical inner chamber;
wherein the rotor assembly is fitted over a portion of the main shaft located in the cylindrical inner chamber, and is an eccentric rotor assembly or a planetary revolution type rotor assembly.

10. The rotary device of claim 9, wherein:
the rotor assembly is the eccentric rotor assembly and comprises:
an eccentric crankshaft which is fitted over a portion of the main shaft located in the cylindrical inner chamber, and has a central axis being parallel to the central axis of the main shaft and offsetting from the central axis of the main shaft by a preset distance; and
a rolling piston wheel which is fitted over the eccentric crankshaft, has a central axis coinciding with the central axis of the eccentric crankshaft, and rolls along an inner cylindrical surface of the cylinder block to form a crescent sealed working space.

* * * * *